United States Patent
Hong

(10) Patent No.: US 11,134,429 B2
(45) Date of Patent: Sep. 28, 2021

(54) METHOD AND APPARATUS FOR CONTROLLING TERMINAL ACCESS

(71) Applicant: BEIJING XIAOMI MOBILE SOFTWARE CO., LTD., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/889,422

(22) Filed: Jun. 1, 2020

(65) Prior Publication Data
US 2020/0296655 A1   Sep. 17, 2020

Related U.S. Application Data

(63) Continuation of application No. PCT/CN2017/115279, filed on Dec. 8, 2017.

(51) Int. Cl.
| | | |
|---|---|---|
| *H04W 48/04* | (2009.01) | |
| *H04W 4/42* | (2018.01) | |
| *H04W 48/08* | (2009.01) | |

(52) U.S. Cl.
CPC ............ *H04W 48/04* (2013.01); *H04W 4/42* (2018.02); *H04W 48/08* (2013.01)

(58) Field of Classification Search
CPC . H04W 48/12; H04W 36/32; H04W 74/0866; H04W 48/16; H04W 48/20; H04W 48/04; H04W 48/10; H04W 48/18; H04W 4/027; H04W 24/02; H04W 48/08; H04W 60/00; H04W 88/08; H04W 4/42; H04W 48/02
See application file for complete search history.

(56) References Cited

U.S. PATENT DOCUMENTS

| | | | |
|---|---|---|---|
| 8,711,845 B2 | 4/2014 | Oran et al. | |
| 2011/0268109 A1 | 11/2011 | Miyata | |
| 2012/0220302 A1* | 8/2012 | Ebara | H04W 36/00835 |
| | | | 455/437 |
| 2013/0343319 A1 | 12/2013 | Quan et al. | |
| 2015/0208302 A1 | 7/2015 | Uemura | |
| 2016/0249275 A1 | 8/2016 | Yang et al. | |

(Continued)

FOREIGN PATENT DOCUMENTS

| | | |
|---|---|---|
| CN | 102118833 A | 7/2011 |
| CN | 102238526 A | 11/2011 |

(Continued)

OTHER PUBLICATIONS

Translation of CN103582018A, published on Feb. 12, 2014 (Year: 2014).*
International Search Report and Written Opinion of the International Application No. PCT/CN2017/115279, dated Jul. 25, 2018, (6p).

(Continued)

*Primary Examiner* — Daniel Lai
(74) *Attorney, Agent, or Firm* — Arch & Lake LLP

(57) ABSTRACT

Methods and apparatuses are provided for controlling terminal access applied to a base station. The method includes setting an access blocking rule for controlling terminal access, where the base station is capable of providing a high-speed-railway dedicated network service for a terminal, and sending the access blocking rule to the terminal so that the terminal initiates access to the base station when determining, according to the access blocking rule, that a preset terminal access condition is met.

14 Claims, 15 Drawing Sheets

(56) References Cited

U.S. PATENT DOCUMENTS

| | | | | |
|---|---|---|---|---|
| 2017/0201925 | A1* | 7/2017 | Chong | H04W 60/04 |
| 2017/0289834 | A1* | 10/2017 | Axmon | H04W 72/04 |
| 2019/0098543 | A1* | 3/2019 | Kim | H04W 36/0085 |
| 2020/0022065 | A1* | 1/2020 | Yan | H04W 36/32 |
| 2020/0128467 | A1* | 4/2020 | Gao | H04W 48/16 |
| 2020/0236605 | A1* | 7/2020 | Yiu | H04W 36/24 |

FOREIGN PATENT DOCUMENTS

| | | |
|---|---|---|
| CN | 103024868 A | 4/2013 |
| CN | 103582018 A | 2/2014 |
| EP | 2750451 A1 | 7/2014 |
| EP | 2750451 A4 | 11/2014 |
| EP | 2869638 A1 | 5/2015 |

OTHER PUBLICATIONS

Supplementary European Search Report in the European Application No. 17934314.0, dated Jun. 14, 2021, (12p).

3GPP TSG RAN WG2 Meeting #100 R2-1712616, Reno, United State, Nov. 30-Dec. 3, 2017, Agenda item: 9.19, Source: Intel Corporation, CMCC, Title: Cell reselection for the UE on high-speed-dedicated network, Document for: Discussion and Decision, (4p).

3GPP TSG RAN WG2 Meeting #100, R2-1713255, Reno, Nevada, USA, Nov. 27-Dec. 1, 2017 Revision of R2-1709000, Agenda item: 9.19, Source: CMCC, MediaTek Inc., Title: Solutions for UE camping in high speed railway scenario, Document for: Discussion, (3p).

Office Action of the Indian Application No. 202047027032, dated Aug. 16, 2021, (8p).

* cited by examiner

METHOD AND APPARATUS FOR CONTROLLING TERMINAL ACCESS

CROSS-REFERENCE TO RELATED APPLICATION

This application is a continuation application of International Patent Application No. PCT/CN2017/115279, filed on Dec. 8, 2017, the entire contents of which are hereby incorporated by reference in its entirety for all purposes.

TECHNICAL FIELD

This application is related to the technical field of communications. More specifically, this disclosure relates to methods and apparatuses for controlling terminal access.

BACKGROUND

With the rapid development of high-speed railway technologies and fast deployment and opening of high-speed railways, more and more users choose to travel by high-speed railways. In order to meet the communication demand of mobile users on the high-speed railways and ensure the quality of communication for the mobile users on the high-speed railways, operators choose to deploy a high-speed-railway dedicated network to try to specifically serve the mobile users on the high-speed railways. In the related art, depending on the conditions of frequency resources in different regions, the high-speed-railway dedicated network may or may not share frequencies with a public long-term evolution (LTE) network. However, since a high-speed-railway dedicated network usually has better coverage, user equipment not on a high-speed railway often access the high-speed-railway dedicated network, especially in largely populated urban areas. Congestion may be easily caused to the high-speed-railway dedicated network, affecting the quality of communication for the mobile users on the high-speed railways.

SUMMARY

Examples of the present disclosure provide methods and apparatus for controlling terminal access.

According to a first aspect of the disclosure, there is provided a method for controlling terminal access, applied to a base station. The method may include configuring an access barring rule for controlling terminal access. The base station is capable of providing a high-speed-railway dedicated network service for a terminal. The method may further include sending the access barring rule to the terminal to enable the terminal to initiate access to the base station in response to determining, according to the access barring rule, that a preset terminal access condition is satisfied.

According to a second aspect of the disclosure, there is provided a method for controlling terminal access, applied to a terminal. The terminal may include receiving an access barring rule from a base station when the terminal requests access to the base station. The base station is capable of providing a high-speed-railway dedicated network service. The terminal may further include initiating access to the base station in response to determining, according to the access barring rule, that a preset terminal access condition is satisfied.

According to a third aspect of the disclosure, there is provided a device for controlling terminal access, applied to a base station. The device may include one or more processors, a non-transitory computer-readable memory storing instructions executable by the one or more processors. The one or more processors may be configured to configure an access barring rule for controlling terminal access. The base station may be capable of providing a high-speed-railway dedicated network service for a terminal. The one or more processors may also be configured to send the access barring rule to the terminal, to enable the terminal to initiate access to the base station in response to determining, according to the access barring rule, that a preset terminal access condition is satisfied.

According to a fourth aspect of the disclosure, there is provided a device for controlling terminal access, applied to a terminal. The device may include one or more processors, a non-transitory computer-readable memory storing instructions executable by the one or more processors. The one or more processors may be configured to receive an access barring rule from the base station when the terminal needs to access the base station. The base station is capable of providing a high-speed-railway dedicated network service. The one or more processors may also be configured to initiate access to the base station in response to determining, according to the access barring rule, that a preset terminal access condition is satisfied.

It is to be understood that the general description above and detailed description below are merely examples and explanatory, and are not intended to restrict the present disclosure.

BRIEF DESCRIPTION OF THE DRAWINGS

The accompanying drawings herein are incorporated into the specification and constitute part of the present specification, illustrate embodiments consistent with the disclosure and are intended for explaining the principles of the disclosure together with the specification.

DETAILED DESCRIPTION

A detailed description will be made here to embodiments, examples of which are illustrated in the accompanying drawings. When drawings are referred to in the following description, identical numerals in different drawings refer to identical or similar elements, unless otherwise indicated. Implementations described in the following embodiments do not mean all the implementations consistent with the disclosure. On the contrary, they are merely examples of apparatuses and methods consistent with some aspects of the disclosure detailed in the appended claims.

Terms used in the disclosure are only for the purpose of describing specific embodiments and not intended to limit the disclosure. "a/an," "said" and "the" in a singular form in the disclosure and the appended claims are also intended to include a plural form unless other meanings are clearly denoted throughout the present disclosure. It is also to be understood that the term "and/or" used in the disclosure refers to and includes any or all possible combinations of one or multiple associated items that are listed.

It is to be understood that, although terms first, second, third, and the like may be used to describe various information in the present disclosure, the information should not be limited to these terms. These terms are only used to distinguish the information of the same type. For example, without departing from the scope of the disclosure, the first information may also be called second information, and, similarly, the second information may also be called first information. For example, the term "if" used here may be explained as "while" or "when" or "responsive to determining," which depends on the context.

Figure 1:
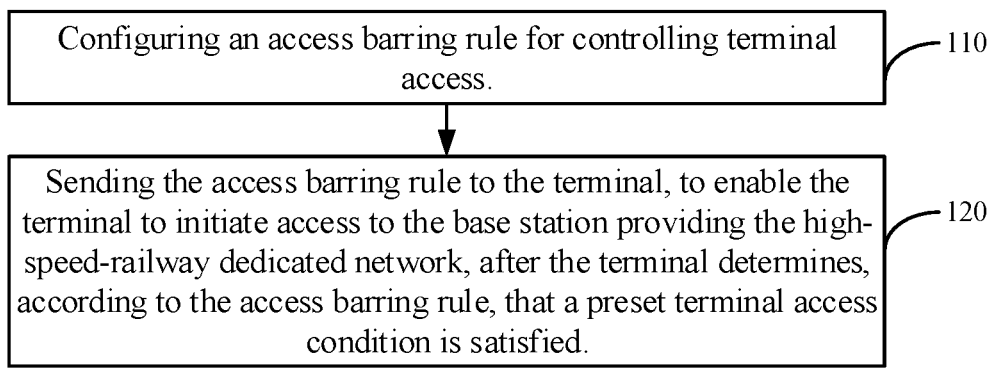
FIG. 1 illustrates a flowchart of a method for controlling terminal access, according to an example of the present disclosure.
Figure 2:
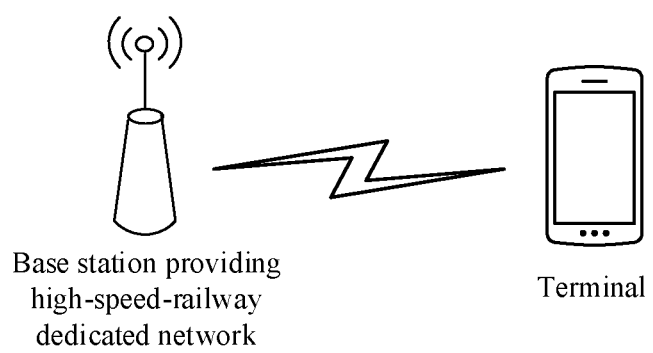
FIG. 2 illustrates a scenario diagram of a method for controlling terminal access, according to an example of the present disclosure.

FIG. 1 illustrates a flowchart of a method for controlling terminal access, in accordance with the present disclosure. FIG. 2 illustrates a scenario diagram of a method for controlling terminal access, in accordance with the present disclosure. The method for controlling terminal access may be applied to a base station capable of providing a high-speed-railway dedicated network service for a terminal. As illustrated in FIG. 1, the method for controlling terminal access includes steps 110 to 120.

In step 110, an access barring rule for controlling terminal access is configured. For example, the access barring rule may be a set of rules used to prevent access of a terminal to a base station. In another example, the access barring rule may be a set of rules used to grant access of a terminal to a base station.

In embodiments of the disclosure, the access barring rule is configured by a base station providing a high-speed-railway dedicated network, so as to control access of different terminals.

In step 120, the access barring rule is sent to the terminal to enable the terminal to initiate access to the base station providing the high-speed-railway dedicated network, in response to the fact that the terminal determines, according to the access barring rule, that a preset terminal access condition is satisfied.

In an example scenario, as illustrated in FIG. 2, the scenario includes a terminal and a base station providing a high-speed-railway dedicated network. The base station providing the high-speed-railway dedicated network configures an access barring rule for controlling terminal access, in advance, and sends the access barring rule to the terminal within the coverage of the base station. When the terminal needs to access the base station providing the high-speed-railway dedicated network, the terminal needs to firstly receive the access barring rule from the base station providing the high-speed-railway dedicated network, and then determines, according to the access barring rule, whether a preset terminal access condition is satisfied. If the preset terminal access condition is satisfied, the terminal can initiate access to the base station providing the high-speed-railway dedicated network. If the preset terminal access condition is not satisfied, the terminal cannot initiate access to the base station providing the high-speed-railway dedicated network.

It can be seen from the embodiment above that, an access barring rule for controlling terminal access is configured and sent to a terminal, to enable the terminal to initiate access to the base station providing a high-speed-railway dedicated network, in response to the fact that the terminal determines, according to the access barring rule, that a preset terminal access condition is satisfied. As such, the purpose of controlling access of different terminals is achieved through the access barring rule, so as to avoid congestion caused due to the fact that any terminal can access the high-speed-railway dedicated network, and improve the quality of service for the high-speed-railway dedicated network.

In one or more embodiments, the access barring rule in step 110 includes preset correspondences between terminal moving speeds and access barring parameters. For example, the preset correspondences may be preset relationships between terminal moving speeds and access barring parameters. In another example, the terminal moving speed may be the speed of a terminal as it travels on a high-speed-train. In an additional example, the access barring parameter may be a threshold that must be met by the terminal moving speed.

In embodiments of the disclosure, the preset correspondences may be configured in advance according to actual conditions by the base station providing the high-speed-railway dedicated network.

It can be seen from the embodiment above that the access barring rule configured by the base station providing the high-speed-railway dedicated network may include preset correspondences between terminal moving speeds and access barring parameters. As such, by configuring a different access barring parameter for each terminal moving speed, the base station providing the high-speed-railway dedicated network achieves the purpose of controlling access of different terminals, and also improves the accuracy of terminal access control.

In one or more embodiments, the access barring rule in step 110 includes preset correspondences between terminal moving speeds and access barring parameters. Moreover, the preset correspondences between the terminal moving speeds and the access barring parameters include: at least one terminal moving speed level or speed state, each terminal moving speed level or speed state corresponding to a terminal moving speed range and an access barring parameter, terminal moving speed ranges corresponding to the respective terminal moving speed levels or speed states being different from each other.

In some embodiments, the base station providing the high-speed-railway dedicated network may divide terminal moving speeds into several speed levels or speed states, and the terminal moving speeds corresponding to respective terminal moving speed levels or speed states are different from each other.

For example, the base station providing the high-speed-railway dedicated network divides terminal moving speeds into the following 5 levels. At a first speed level or speed state, the terminal moving speed is within the range of 0 km/h to 10 km/h, or the terminal performs cell reselection once in one minute. At a second speed level or speed state, the terminal moving speed is within the range of 10 km/h to 50 km/h, or the terminal performs cell reselection for 10 times in one minute. At a third speed level or speed state, the terminal moving speed is within the range of 50 km/h to 100 km/h, or the terminal performs cell reselection for 20 times in one minute. At a fourth speed level or speed state, the terminal moving speed is within the range of 100 km/h to 200 km/h, or the terminal performs cell reselection for 30 times in one minute. At a fifth speed level or speed state, the terminal moving speed is above 200 km/h, or the terminal performs cell reselection for more than 30 times in one minute.

The base station providing the high-speed-railway dedicated network may also configure an access barring parameter for each terminal moving speed level or speed state. The value of the access barring parameter may be within 0 to 1.

The magnitude of the access barring parameter may indicate the extent of access barring for the terminal by the base station providing the high-speed-railway dedicated network. A greater access barring parameter indicates a lower extent of access barring, and the possibility of the terminal accessing the base station providing the high-speed-railway dedicated network is higher. For example, the greater the access barring parameter, the greater the possibility that the terminal accesses the high-speed-railway dedicated network. In contrast, a smaller access barring parameter indicates a greater extent of access barring, and the possibility of the terminal accessing the base station providing the high-speed-railway dedicated network is lower.

For example, when the terminal moving speed is lower than 10 km/h or the terminal performs cell reselection for no more than once in one minute, the corresponding access barring parameter is 0.5. When the terminal moving speed is greater than 200 km/h or the terminal performs cell reselection for more than 30 times in one minute, the corresponding access barring parameter is 1. In this way, it can be ensured that a mobile user on a high-speed railway can initiate access to the base station providing the high-speed-railway dedicated network.

It can be seen from the embodiment above that the access barring rule configured by the base station providing the high-speed-railway dedicated network may include preset correspondences between terminal moving speeds and access barring parameters. The preset correspondences between the terminal moving speeds and the access barring parameters include at least one terminal moving speed level or speed state, and each terminal moving speed level or speed state corresponds to a terminal moving speed range and an access barring parameter, terminal moving speed ranges corresponding to the respective terminal moving speed levels or speed states are different from each other. As such, the base station providing the high-speed-railway dedicated network can optimize the configuration of the access barring parameter by means of the terminal moving speed levels or speed states, and the efficiency of terminal access control is also improved.

In o embodiment, the access barring rule in step 110 includes preset correspondences between terminal moving speeds and access barring parameters. Moreover, the preset correspondences between the terminal moving speeds and the access barring parameters include: at least one terminal moving speed level or speed state, each terminal moving speed level or speed state corresponding to a terminal moving speed range and an access barring parameter, terminal moving speed ranges corresponding to the respective terminal moving speed levels or speed states being different from each other. In addition, the access barring parameters corresponding to the respective terminal moving speed levels or speed states are different from each other.

In embodiments of the disclosure, the base station providing the high-speed-railway dedicated network may configure a different access barring parameter for each terminal moving speed level or speed state, and the value of the access barring parameter is within the range of 0 to 1.

It can be seen from the embodiment above that, in the access barring rule configured by the base station providing the high-speed-railway dedicated network, the terminal moving speed levels or speed states corresponding to the respective access barring parameters are different from each other, thus improving the precision of terminal access control.

Figure 3:
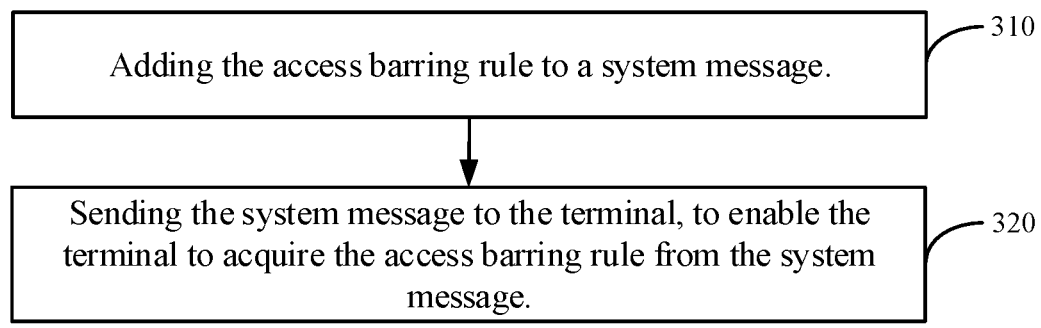
FIG. 3 illustrates a flowchart of another method for controlling terminal access, according to an example of the present disclosure.

FIG. 3 illustrates a flowchart of another method for controlling terminal access, in accordance with the present disclosure. The method for controlling terminal access may be applied to a base station capable of providing a high-speed-railway dedicated network service for a terminal. Based on the method as illustrated in FIG. 1, step 120 may include steps 310 to 320, as illustrated in FIG. 3.

In step 310, the access barring rule is added to a system message.

In embodiments of the disclosure, the base station providing the high-speed-railway network adds, to the system message, information for performing access barring on terminals at different moving speeds, and broadcasts the system message.

In step 320, the system message is sent to the terminal to enable the terminal to acquire the access barring rule from the system message.

It can be seen from the embodiment above that, the access barring rule is added to the system message, and the system message is sent to the terminal so that the terminal can quickly acquire the access barring rule from the system message, so as to improve the convenience in acquiring the access barring rule.

In one or more embodiments, the system message in step 310 may be a system information block type 2 (SIB2) in particular.

In embodiments of the disclosure, the SIB2 is a system message 2 in an LTE network. Besides bearing the access barring rule in the SIB2, the access barring rule may be borne by other information blocks or by designing a new information block.

It can be seen from the embodiment above that, the access barring rule is added to the SIB2, and the SIB2 is sent to the terminal so that the terminal can quickly acquire the access barring rule from the SIB2, so as to improve the reliability in transmitting the access barring rule.

Figure 4:
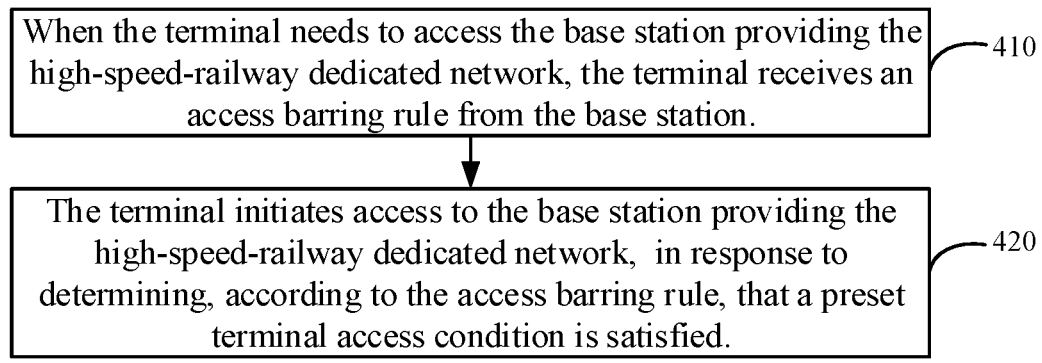
FIG. 4 illustrates a flowchart of a method for controlling terminal access, according to an example of the present disclosure.

FIG. 4 illustrates a flowchart of a method for controlling terminal access, in accordance with the present disclosure. The method for controlling terminal access may be applied to a terminal for which a base station is capable of providing a high-speed-railway dedicated network service. As illustrated in FIG. 4, the method for controlling terminal access includes steps 410 to 420.

In step 410, when the terminal needs to access the base station providing the high-speed-railway dedicated network, the terminal receives an access barring rule from the base station.

In embodiments of the disclosure, the access barring rule is configured by a base station providing a high-speed-railway dedicated network, so as to control access of different terminals.

In step 420, the terminal initiates access to the base station providing the high-speed-railway dedicated network, in response to determining, according to the access barring rule, that a preset terminal access condition is satisfied.

In embodiments of the disclosure, when the terminal needs to access the base station providing the high-speed-railway dedicated network, the terminal firstly needs to receive the access barring rule from the base station providing the high-speed-railway dedicated network, and then determines, according to the access barring rule, whether a preset terminal access condition is satisfied. If the preset terminal access condition is satisfied, the terminal can initiate access to the base station providing the high-speed-railway dedicated network. If the preset terminal access condition is not satisfied, the terminal cannot initiate access to the base station providing the high-speed-railway dedicated network.

It can be seen from the embodiment above that when a terminal needs to access a base station providing a high-speed-railway dedicated network, the terminal needs to receive an access barring rule from the base station, and then initiate access to the base station providing the high-speed-railway dedicated network in response to the fact that the terminal determines, according to the access barring rule, that a preset terminal access condition is satisfied. The purpose of controlling access of different terminals is achieved through the access barring rule, so as to avoid congestion caused due to the fact that any terminal can access the high-speed-railway dedicated network, and improve the quality of service for the high-speed-railway dedicated network.

Figure 5:
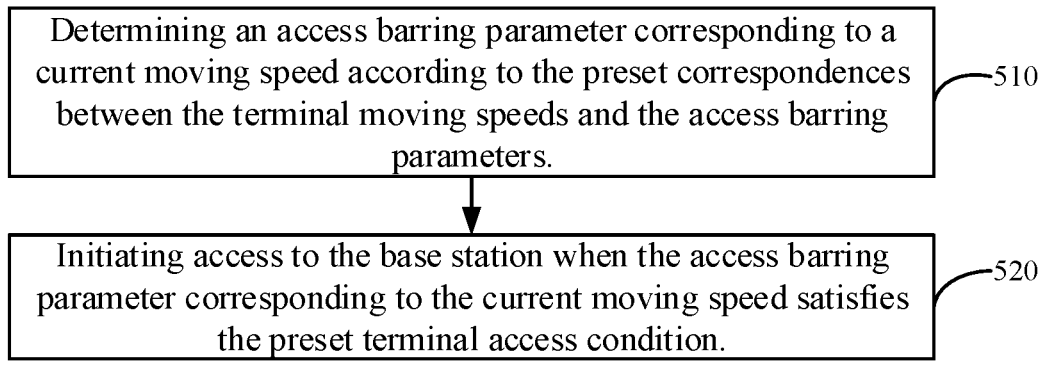
FIG. 5 illustrates a flowchart of another method for controlling terminal access, according to an example of the present disclosure.

FIG. 5 illustrates a flowchart of another method for controlling terminal access, in accordance with the present disclosure. The method for controlling terminal access may be applied to a terminal for which a base station is capable of providing a high-speed-railway dedicated network service. Based on the method as illustrated in FIG. 4, the access barring rule includes preset correspondences between terminal moving speeds and access barring parameters. Step 420 may include steps 510 to 520, as illustrated in FIG. 5.

In step 510, an access barring parameter corresponding to a current moving speed is determined according to the preset correspondences between the terminal moving speeds and the access barring parameters.

In embodiments of the disclosure, the access barring rule is configured by a base station providing a high-speed-railway dedicated network, so as to control access of different terminals.

In step 520, access is initiated to the base station when the access barring parameter corresponding to the current moving speed satisfies the preset terminal access condition.

In embodiments of the disclosure, the terminal can determine, according to the access barring parameter corresponding to the current moving speed, whether the preset terminal access condition is satisfied. If the preset terminal access condition is satisfied, the terminal can initiate access to the base station providing the high-speed-railway dedicated network. If the preset terminal access condition is not satisfied, the terminal cannot initiate access to the base station providing the high-speed-railway dedicated network.

It can be seen from the embodiment above that, an access barring parameter corresponding to a current moving speed is determined according to the preset correspondences between the terminal moving speeds and the access barring parameters. Access is initiated to the base station when the access barring parameter corresponding to the current moving speed satisfies the preset terminal access condition. Access cannot be initiated to the base station when the access barring parameter corresponding to the current moving speed does not satisfy the preset terminal access condition. As such, by configuring a different access barring parameter for each terminal moving speed, the base station providing the high-speed-railway dedicated network can achieve the purpose of controlling access of different terminals, and also improve the accuracy of terminal access control.

Figure 6:
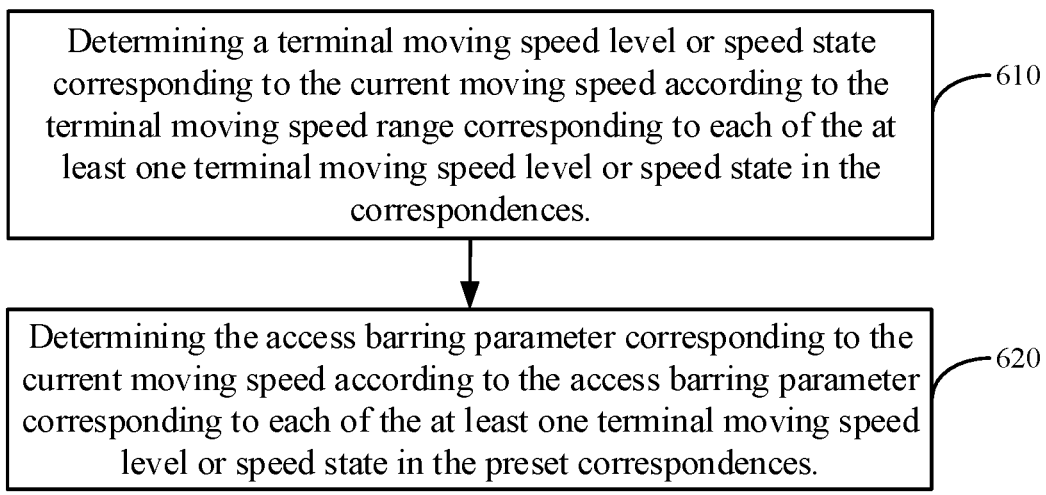
FIG. 6 illustrates a flowchart of another method for controlling terminal access, according to an example of the present disclosure.

FIG. 6 illustrates a flowchart of another method for controlling terminal access, in accordance with the present disclosure. The method for controlling terminal access may be applied to a terminal for which a base station is capable of providing a high-speed-railway dedicated network service. Based on the method as illustrated in FIG. 5, the access barring rule includes preset correspondences between terminal moving speeds and access barring parameters. The preset correspondences between the terminal moving speeds and the access barring parameters include: at least one terminal moving speed level or speed state, each terminal moving speed level or speed state corresponding to a terminal moving speed range and an access barring parameter, terminal moving speed ranges corresponding to the respective terminal moving speed levels or speed states being different from each other. Step 510 may include steps 610 to 620, as illustrated in FIG. 6.

In step 610, a terminal moving speed level or speed state corresponding to the current moving speed is determined according to the terminal moving speed range corresponding to each of the at least one terminal moving speed level or speed state in the correspondences. For example, the correspondences may be the preset correspondences.

In embodiments of the disclosure, due to the fact that the base station providing the high-speed-railway dedicated network divides terminal moving speeds into several speed levels or speed states, and terminal moving speeds corresponding to the respective terminal moving speed levels or speed states are different from each other, the terminal needs to determine the terminal moving speed level or speed state to which the current moving speed belongs.

In step 620, the access barring parameter corresponding to the current moving speed is determined according to the access barring parameter corresponding to each of the at least one terminal moving speed level or speed state in the preset correspondences.

In embodiments of the disclosure, the base station providing the high-speed-railway dedicated network also configures an access barring parameter for each terminal moving speed level or speed state. The value of the access barring parameter is within the range of 0 to 1. The terminal needs to determine the access barring parameter corresponding to the terminal moving speed level or speed state to which the current moving speed belongs, to be the access barring parameter corresponding to the current moving speed.

It can be seen from the embodiment above that, a terminal moving speed level or speed state corresponding to the current moving speed is determined according to the terminal moving speed range corresponding to each of the at least one terminal moving speed level or speed state in the correspondences. The access barring parameter corresponding to the current moving speed is determined according to the access barring parameter corresponding to each of the at least one terminal moving speed level or speed state in the preset correspondences. As such, the access barring parameter corresponding to the current moving speed is determined according to the terminal moving speed level or speed state, and the speed of acquiring the access barring parameter is improved.

Figure 7:
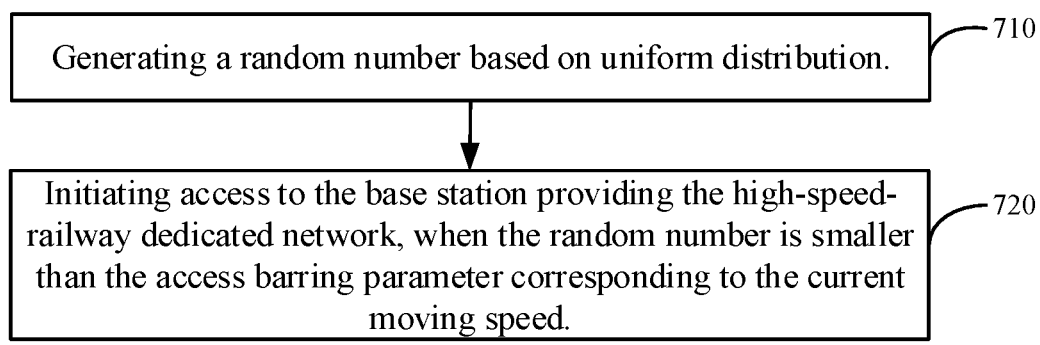
FIG. 7 illustrates a flowchart of another method for controlling terminal access, according to an example of the present disclosure.

FIG. 7 illustrates a flowchart of another method for controlling terminal access, in accordance with the present disclosure. The method for controlling terminal access may be applied to a terminal for which a base station is capable of providing a high-speed-railway dedicated network service. Based on the method as illustrated in FIG. 5, the access barring rule includes preset correspondences between terminal moving speeds and access barring parameters. The preset terminal access condition includes that a random number generated based on uniform distribution is smaller than the access barring parameter corresponding to the current moving speed. Step 520 may include steps 710 to 720, as illustrated in FIG. 7.

In step 710, a random number is generated based on uniform distribution.

In embodiments of the disclosure, the value of the random number is within the range of 0 to 1, so that the cell prevents access of some users according to load conditions, so as to avoid overload of the cell.

In step 720, access is initiated to the base station providing the high-speed-railway dedicated network, when the random number is smaller than the access barring parameter corresponding to the current moving speed.

In embodiments of the disclosure, the access barring parameter corresponding to the current moving speed is configured by the base station providing the high-speed-railway dedicated network. When the random number is smaller than the access barring parameter corresponding to the current moving speed, it indicates that the preset terminal access condition is satisfied, and access can be initiated to the base station providing the high-speed-railway dedicated network. When the random number is not smaller than the access barring parameter corresponding to the current moving speed, it indicates that the preset terminal access condition is not satisfied, and access cannot be initiated to the base station providing the high-speed-railway dedicated network.

It can be seen from the embodiment above that, a random number is generated based on uniform distribution, and access is initiated to the base station providing the high-speed-railway dedicated network, when the random number is smaller than the access barring parameter corresponding to the current moving speed. When the random number is not smaller than the access barring parameter corresponding to the current moving speed, it indicates that the preset terminal access condition is not satisfied, and access cannot be initiated to the base station providing the high-speed-railway dedicated network. As such, the purpose of controlling access of different terminals is achieved through the access barring parameter corresponding to the current terminal moving speed, congestion caused due to the fact that any terminal can access the high-speed-railway dedicated network is avoided, and the quality of service of the high-speed-railway dedicated network is improved.

Corresponding to the preceding embodiments of the method for controlling terminal access, embodiments of a device for controlling terminal access is also provided in the disclosure.

Figure 8:
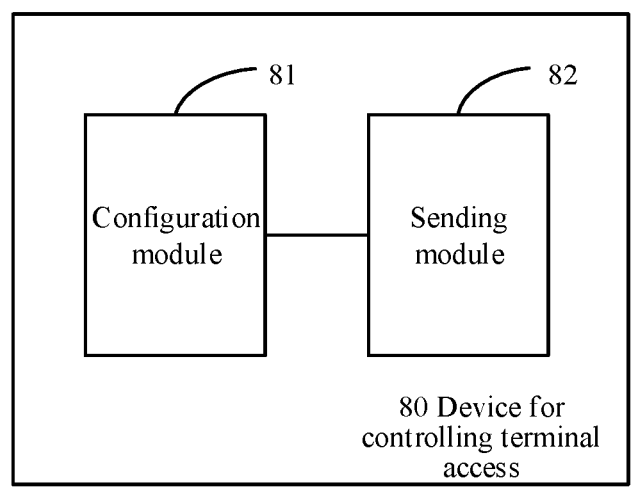
FIG. 8 illustrates a block diagram of a device for controlling terminal access, according to an example of the present disclosure.

FIG. 8 illustrates a block diagram of a device for controlling terminal access, in accordance with the present disclosure. The device may be applied to a base station capable of providing a high-speed-railway dedicated network service for a terminal, and is used for performing the method for controlling terminal access as illustrated in FIG. 1. As illustrated in FIG. 8, the device for controlling terminal access may include a configuration module 81 and a sending module 82.

The configuration module is configured to configure an access barring rule for controlling terminal access.

The sending module is configured to send the access barring rule to the terminal to enable the terminal to initiate access to the base station in response to determining, according to the access barring rule, that a preset terminal access condition is satisfied.

It can be seen from the embodiment above that, an access barring rule for controlling terminal access is configured and sent to a terminal, to enable the terminal to initiate access to the base station providing a high-speed-railway dedicated network, in response to the fact that the terminal determines, according to the access barring rule, that a preset terminal access condition is satisfied. As such, the purpose of controlling access of different terminals is achieved through the access barring rule, so as to avoid congestion caused due to the fact that any terminal can access the high-speed-railway dedicated network, and improve the quality of service for the high-speed-railway dedicated network.

In one or more embodiments, the access barring rule includes preset correspondences between terminal moving speeds and access barring parameters.

It can be seen from the embodiment above that the access barring rule configured by the base station providing the high-speed-railway dedicated network may include preset correspondences between terminal moving speeds and access barring parameters. As such, by configuring a different access barring parameter for each terminal moving speed, the base station providing the high-speed-railway dedicated network achieves the purpose of controlling access of different terminals, and also improves the accuracy of terminal access control.

In one or more embodiments, the preset correspondences between the terminal moving speeds and the access barring parameters include: at least one terminal moving speed level or speed state, each terminal moving speed level or speed state corresponding to a terminal moving speed range and an access barring parameter, terminal moving speed ranges corresponding to the respective terminal moving speed levels or speed states being different from each other.

It can be seen from the embodiment above that the access barring rule configured by the base station providing the high-speed-railway dedicated network may include preset correspondences between terminal moving speeds and access barring parameters. The preset correspondences between the terminal moving speeds and the access barring parameters include: at least one terminal moving speed level or speed state, each terminal moving speed level or speed state corresponding to a terminal moving speed range and an access barring parameter, terminal moving speed ranges corresponding to the respective terminal moving speed levels or speed states being different from each other. As such, the base station providing the high-speed-railway dedicated network can optimize the configuration of the access barring parameter according to the terminal moving speed levels or speed states, and the efficiency of controlling terminal access is also improved.

In one or more embodiments, access barring parameters corresponding to the respective terminal moving speed levels or speed states are different from each other.

It can be seen from the embodiment above that, in the access barring rule configured by the base station providing the high-speed-railway dedicated network, different terminal moving speed levels or speed states correspond to different access barring parameters, thus improving the precision of terminal access control.

Figure 9:
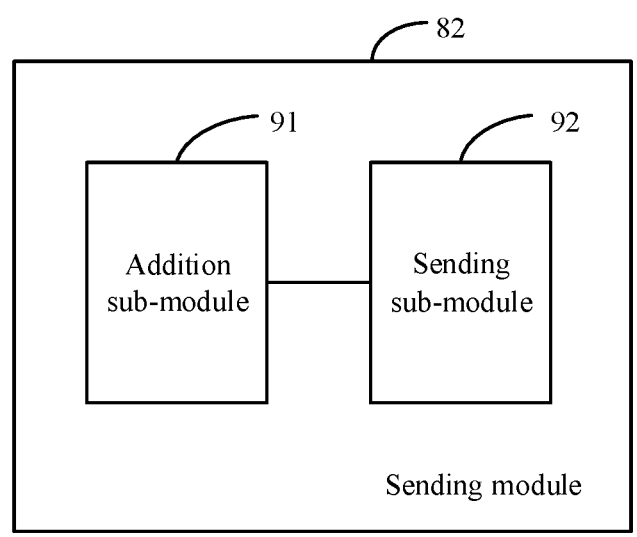
FIG. 9 illustrates a block diagram of another device for controlling terminal access, according to an example of the present disclosure.

In one or more embodiments, based on the device as illustrated in FIG. 8, the sending module 82 may include an addition sub-module 91 and a sending sub-module 92, as illustrated in FIG. 9.

The addition sub-module is configured to add the access barring rule to a system message.

The sending sub-module is configured to send the system message to the terminal, to enable the terminal to acquire the access barring rule from the system message.

It can be seen from the embodiments above that the access barring rule is added to the system message, and the system message is sent to the terminal, so that the terminal can quickly acquire the access barring rule from the system message, so as to improve the convenience in acquiring the access barring rule.

In one or more embodiments, the system message is an SIB2 in particular.

It can be seen from the embodiments above that the access barring rule is added to the SIB2, and the SIB2 is sent to the terminal so that the terminal can quickly acquire the access barring rule from the SIB2, so as to improve the reliability of the transmission of the access barring rule.

Figure 10:
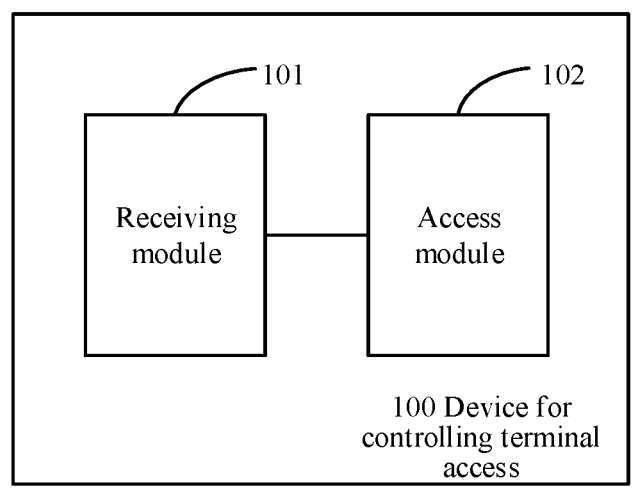
FIG. 10 illustrates a block diagram of a device for controlling terminal access, according to an example of the present disclosure.

FIG. 10 illustrates a block diagram of a device for controlling terminal, in accordance with the present disclosure. The device may be applied to a terminal for which a base station is capable of providing a high-speed-railway dedicated network service, and is used for performing the method for controlling terminal access as illustrated in FIG. 4. As illustrated in FIG. 10, the device for controlling terminal access may include a receiving module 101 and an access module 102.

The receiving module is configured to receive an access barring rule from the base station when the terminal needs to access the base station.

The access module is configured to initiate access to the base station in response to determining, according to the access barring rule, that a preset terminal access condition is satisfied.

It can be seen from the embodiment above that, when a terminal needs to access a base station providing a high-speed-railway dedicated network, the terminal needs to receive an access barring rule from the base station, and then initiate access to the base station providing the high-speed-railway dedicated network in response to the terminal determines, according to the access barring rule, that a preset terminal access condition is satisfied. The purpose of controlling access of different terminals is achieved through the access barring rule, so as to avoid congestion caused due to the fact that any terminal can access the high-speed-railway dedicated network, and improve the quality of service for the high-speed-railway dedicated network.

Figure 11:
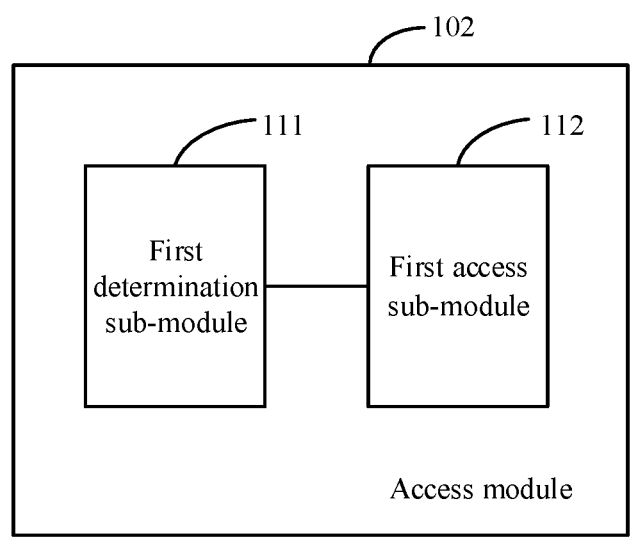
FIG. 11 illustrates a block diagram of another device for controlling terminal access, according to an example of the present disclosure.

In one or more embodiments, based on the device as illustrated in FIG. 10, the access barring rule includes preset correspondences between terminal moving speeds and access barring parameters. As illustrated in FIG. 11, the access module 102 may include a first determination sub-module 111 and a first access sub-module 112.

The first determination sub-module is configured to determine an access barring parameter corresponding to a current moving speed according to the preset correspondences between the terminal moving speeds and the access barring parameters.

The first access sub-module is configured to initiate access to the base station when the access barring parameter corresponding to the current moving speed satisfies the preset terminal access condition.

It can be seen from the embodiment above that an access barring parameter corresponding to a current moving speed is determined according to the preset correspondences between the terminal moving speeds and the access barring parameters. Access is initiated to the base station when the access barring parameter corresponding to the current moving speed satisfies the preset terminal access condition. Access cannot be initiated to the base station when the access barring parameter corresponding to the current moving speed does not satisfy the preset terminal access condition. As such, by configuring a different access barring parameter for each terminal moving speed, the base station providing the high-speed-railway dedicated network achieves the purpose of controlling access of different terminals, and also improves the accuracy of controlling terminal access.

Figure 12:
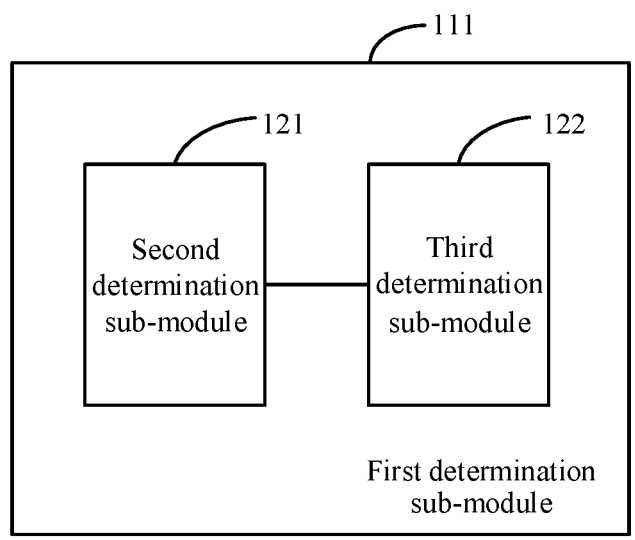
FIG. 12 illustrates a block diagram of another device for controlling terminal access, according to an example of the present disclosure.

In one or more embodiments, based on the device as illustrated in FIG. 11, the access barring rule includes preset correspondences between terminal moving speeds and access barring parameters. The preset correspondences between the terminal moving speeds and the access barring parameters include: at least one terminal moving speed level or speed state, each terminal moving speed level or speed state corresponding to a terminal moving speed range and an access barring parameter, terminal moving speed ranges corresponding to the respective terminal moving speed levels or speed states being different from each other. As illustrated in FIG. 12, the first determination sub-module 111 may include a second determination sub-module 121 and a third determination sub-module 122.

The second determination sub-module is configured to determine a terminal moving speed level or speed state corresponding to the current moving speed, according to the terminal moving speed range corresponding to each of the at least one terminal moving speed level or speed state in the correspondences.

The third determination sub-module is configured to determine the access barring parameter corresponding to the current moving speed, according to the access barring parameter corresponding to each of the at least one terminal moving speed level or speed state in the correspondences.

It can be seen from the embodiment above that, a terminal moving speed level or speed state corresponding to the current moving speed is determined according to the terminal moving speed range corresponding to each of the at least one terminal moving speed level or speed state in the correspondences. The access barring parameter corresponding to the current moving speed is determined according to the access barring parameter corresponding to each of the at least one terminal moving speed level or speed state in the preset correspondences. As such, the access barring parameter corresponding to the current moving speed is determined according to the terminal moving speed level or speed state, and the speed of acquiring the access barring parameter is improved.

Figure 13:
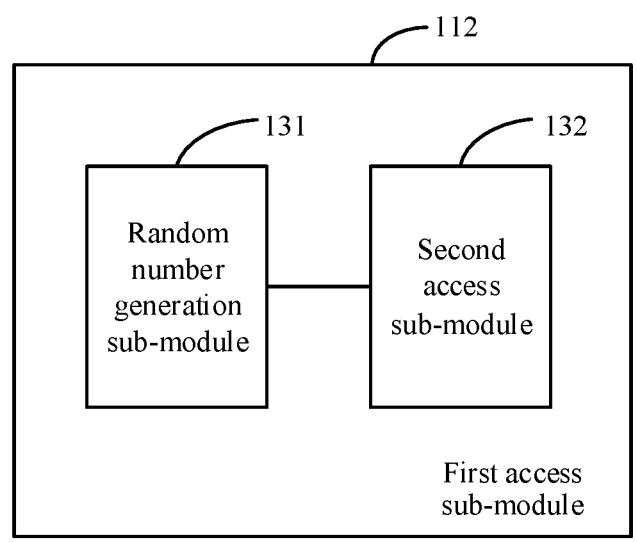
FIG. 13 illustrates a block diagram of another device for controlling terminal access, according to an example of the present disclosure.

In one or more embodiments, based on the device as illustrated in FIG. 11, the access barring rule includes preset correspondences between terminal moving speeds and access barring parameters. The preset terminal access condition includes that a random number be generated based on uniform distribution that is smaller than the access barring parameter corresponding to the current moving speed. As illustrated in FIG. 13, the first access sub-module 112 may include a random number generation sub-module 131 and a second access sub-module 132.

The random number generation sub-module is configured to generate a random number based on uniform distribution.

The second access sub-module is configured to initiate access to the base station when the random number is smaller than the access barring parameter corresponding to the current moving speed.

It can be seen from the embodiment above that, a random number is generated based on uniform distribution, and access is initiated to the base station providing the high-speed-railway dedicated network, when the random number is smaller than the access barring parameter corresponding to the current moving speed. When the random number is not smaller than the access barring parameter corresponding to the current moving speed, it indicates that the preset terminal access condition is not satisfied, and access cannot be initiated to the base station providing the high-speed-railway dedicated network. As such, the purpose of controlling access of different terminals is achieved through the access barring parameter corresponding to the current terminal moving speed, congestion caused due to the fact that any terminal can access the high-speed-railway dedicated network is therefore avoided, and the quality of service for the high-speed-railway dedicated network is improved.

The device embodiments substantially correspond to the method embodiments, and thus for related parts, reference can be made to part of descriptions of the method embodiments. The device embodiments described above are only schematic, units described as separate parts therein may or may not be physically separated, and parts displayed as units may or may not be physical units, and namely may be located in the same place or may also be distributed to multiple network units. Some or all of the modules may be selected according to the present disclosure. Those of ordinary skill in the art may understand and implement the embodiments without paying any creative effort.

Also provided in the disclosure is a non-transitory computer-readable storage medium having stored thereon a computer program for executing the method for controlling terminal access according to any one of FIG. 1 to FIG. 3.

Also provided in the disclosure is a non-transitory computer-readable storage medium having stored thereon a computer program for executing the method for controlling terminal access according to any one of FIG. 4 to FIG. 7

Also provided in the disclosure is a device for controlling terminal access, applied to a base station capable of providing a high-speed-railway dedicated network service for a terminal. The device includes a processor and a memory stored with processor-executable instructions.

The processor is configured to: configure an access barring rule for controlling terminal access; and send the access barring rule to the terminal, to enable the terminal to initiate access to the base station in response to determining, according to the access barring rule, that a preset terminal access condition is satisfied.

Figure 14:
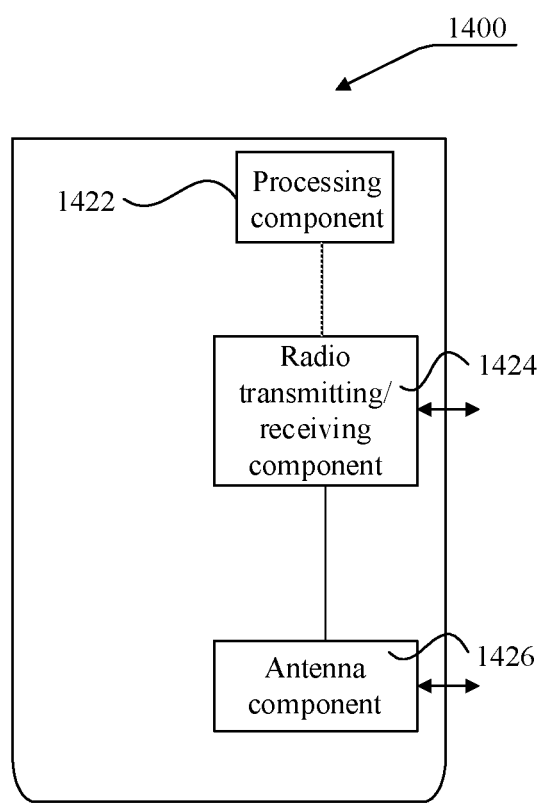
FIG. 14 illustrates a schematic structural diagram of a device for controlling terminal access, according to an example of the present disclosure.

FIG. 14 illustrates a schematic structural diagram of a device for controlling terminal access, in accordance with the present disclosure. The device 1400 may be provided as a base station providing a high-speed-railway dedicated network. As illustrated in FIG. 14, the device 1400 includes a processing component 1422, a radio transmission/receiving component 1424, an antenna component 1426, and a signal processing part specific to a wireless interface. The processing component 1422 may further include one or more processors.

One or more processors of the processing component 1422 may be configured to perform any of the methods for controlling terminal access.

Also provided is a device for controlling terminal access, applied to a terminal for which a base station is capable of providing a high-speed-railway dedicated network service. The device includes a processor, and a memory stored with processor-executable instructions.

The processor is configured to receive an access barring rule from the base station when the terminal needs to access the base station; and initiate access to the base station in response to determining, according to the access barring rule, that a preset terminal access condition is satisfied.

Figure 15:
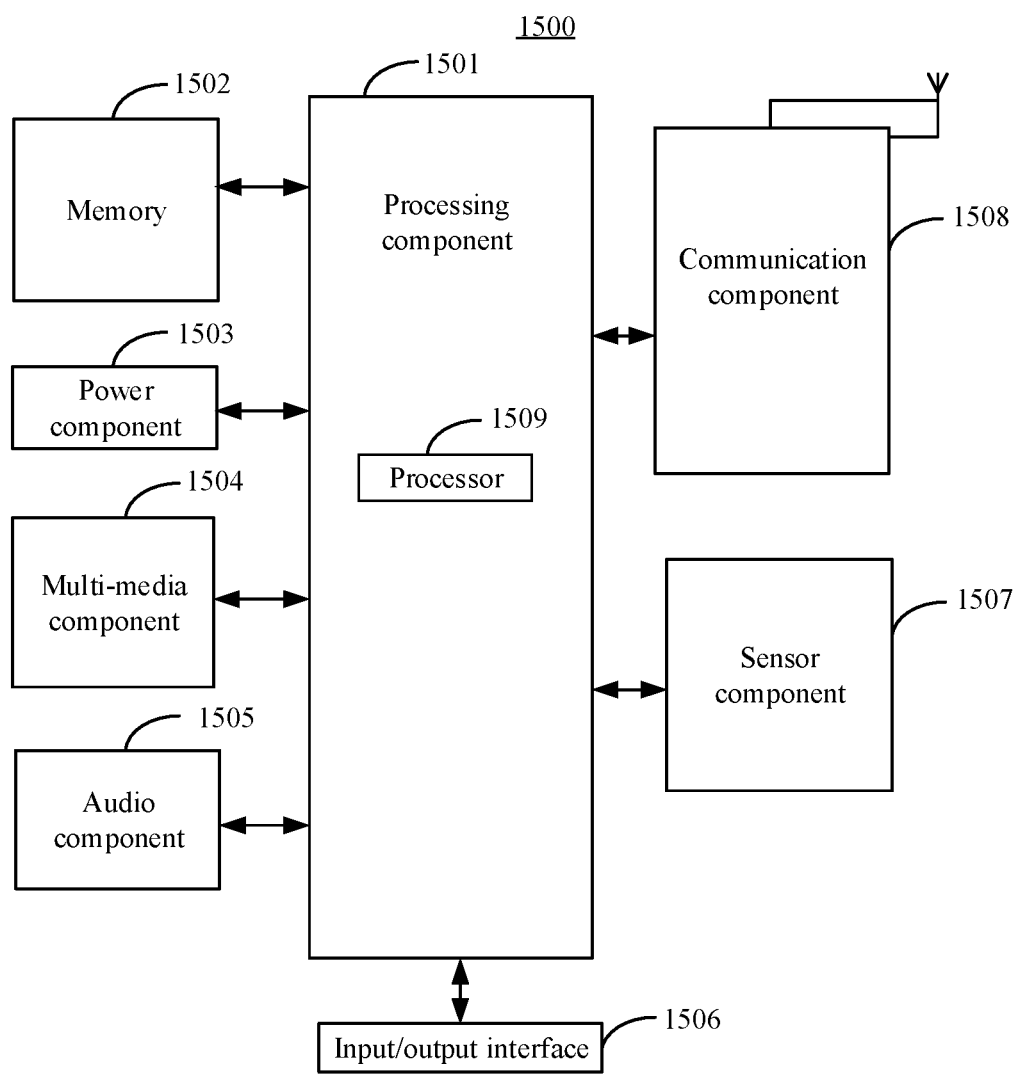
FIG. 15 illustrates a schematic structural diagram of a device for controlling terminal access, according to an example of the present disclosure.

FIG. 15 illustrates a schematic structural diagram of a device for controlling terminal access, in accordance with the present disclosure. FIG. 15 illustrates a device 1500 for controlling terminal access. The device 1500 may be a terminal such as a computer, a mobile phone, a digital broadcast terminal, a message transceiving device, a game console, a tablet device, medical equipment, fitness equipment, a personal digital assistant, etc.

As illustrated in FIG. 15, the device 1500 may include one or more of: a processing component 1501, a memory 1502, a power component 1503, a multi-media component 1504, an audio component 1505, an input/output (I/O) interface 1506, a sensor component 1507, and a communication component 1508.

The processing component 1501 generally controls the overall operation of the device 1500, such as operations associated with a display, a phone call, data communication, a camera operation and a recording operation. The processing component 1501 may include one or more processors 1509 to execute instructions, so as to complete all or some steps in the methods above. In addition, the processing component 1501 may include one or more modules for the interaction between the processing component 1501 and the other components. For example, the processing component 1501 may include a multi-media module for interaction between the multi-media component 1504 and the processing component 1501.

The memory 1502 is configured to store various types of data so as to support operations at the device 1500. The examples of these types of data include instructions of any application or method for operating on the device 1500, contact person data, phone book data, messages, pictures, video, etc. The memory 1502 may be implemented by any type of volatile or non-volatile storage device or a combination of both, for example, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 1503 supplies power for the various components of the device 1500. The power component 1503 may include a power management system, one or more power sources, and other components associated with the generation, management and distribution of power for the device 1500.

The multi-media component 1504 includes a screen serving as an output interface between the device 1500 and a user. In some embodiments, the screen may include a liquid crystal display (LCD) and a touch pad (TP). If the screen includes a touch pad, then the screen may be implemented as a touch screen so as to receive an input signal from the user. The touch pad includes one or more touch sensors to sense touch, slide, and gestures on the touch pad. The touch sensors may not only sense the boundary of a touch or slide action, but also can detect the duration and pressure related to the touch or slide operation. In some embodiments, the multi-media component 1504 includes a front camera and/or a rear camera. When the device 1500 is in an operating mode, such as a photography mode or a video mode, the front camera and/or the rear camera may receive external multi-media data. Each front camera and rear camera may be a fixed optical lens system or have a focal length or optical zoom capability.

The audio component 1505 is configured to output and/or input an audio signal. For example, the audio component 1505 includes a microphone (MIC), and when the device 1500 is in an operating mode, such as a calling mode, a recording mode and a voice recognition mode, the microphone is configured to receive an external audio signal. The received audio signal can be further stored in the memory 1502 or sent via the communication component 1508. In some embodiments, the audio component 1505 further includes a loudspeaker for outputting an audio signal.

The I/O interface 1506 provides an interface between the processing component 1501 and a peripheral interface module, and the above peripheral interface module may be a keyboard, a click wheel, a button, etc. The button may include but is not limited to a home page button, a volume button, a start button and a locking button.

The sensor component 1507 includes one or more sensors for providing state evaluation for the device 1500 from various aspects. For example, the sensor component 1507 may detect an on/off state of the device 1500, and the relative positioning between components; for example, the components are a display and keyboard of the device 1500. The sensor component 1507 may also detect a positional change of the device 1500 or a component of the device 1500, whether there is contact between a user and the battery charging apparatus 1500, the orientation or acceleration/deceleration of the device 1500, and a temperature change of the device 1500. The sensor component 1507 may include a proximity sensor configured to detect the existence of an object nearby without any physical contact. The sensor component 1507 may also include an optical sensor, such as a CMOS or CCD image sensor, for use in an imaging application. In some embodiments, the sensor component 1507 may also include an acceleration sensor, a gyroscope sensor, a magnetic sensor, a pressure sensor or a temperature sensor.

The communication component 1508 is configured for wired or wireless communication between the device 1500 and another device. The device 1500 may access a communication standard based wireless network, such as WI-FI, 2G, 5G or a combination thereof. In one or more embodiments, the communication component 1508 receives a broadcast signal from an external broadcast management system or broadcasts relevant information through a broadcast channel. In one or more embodiments, the communication component 1508 further includes a near-field communication (NFC) module for short-range communication. For example, the NFC module may be implemented based on the radio-frequency identification (RFID) technique, the infrared data association (IrDA) technique, the ultra-wide band (UWB) technique, the BLUETOOTH (BT) technique or others.

In one or more embodiments, the device 1500 may be implemented by one or more application-specific integrated circuit (ASIC), a digital signal processor (DSP), a digital signal processing device (DSPD), a programmable logic device (PLD), a field programmable gate array (FPGA), a controller, a micro-controller, a micro-processor or other electronic elements, for executing the above methods.

In one or more embodiments, a non-transitory computer-readable storage medium including instructions is also provided, for example, a memory 1502 including instructions. The above instructions may be executed by the processor 1509 of the device 1500 to complete the above methods. For example, the non-transitory computer-readable storage medium may be a ROM, a random-access memory (RAM), a CD-ROM, a magnetic tape, a floppy disk, an optical data storage device and so on.

The instructions in the storage medium is executed by the processor to enable the device 1500 to execute a method for controlling terminal access.

Other embodiments of the disclosure would readily occur to those skilled in the art when considering the specification and practicing the disclosure here. The disclosure is aimed at covering any variants, usages or adaptive changes that comply with generic principles of the disclosure and include common knowledge or customary technical means in the art that is not disclosed in the disclosure. The specification and embodiments are merely considered examples, and the true scope and spirit of the disclosure are specified by the appended claims.

It should be understood that the disclosure is not limited to the precise structures described above and illustrated in the accompanying drawings, and modifications and changes may be made thereto without departing from the scope thereof. The scope of the disclosure is merely defined by the appended claims.

What is claimed is:

1. A method for controlling terminal access, comprising:
   configuring, by a base station providing a high-speed-railway dedicated network service for a terminal, an access barring rule for controlling terminal access, wherein the access barring rule comprises preset correspondences between terminal moving speeds and access barring parameters; and
   sending, by the base station, the access barring rule to the terminal to enable the terminal to determine an access barring parameter corresponding to a current moving speed, according to preset correspondences between terminal moving speeds and access barring parameters, and enable the terminal to initiate access to the base station when the access barring parameter corresponding to the current moving speed satisfies a preset terminal access condition,
   wherein the preset correspondences between the terminal moving speeds and the access barring parameters comprise:
   at least one terminal moving speed level or speed state, at least one terminal moving speed level or speed state corresponding to a terminal moving speed range and an access barring parameter, and terminal moving speed ranges corresponding to respective terminal moving speed levels or speed states being different from each other.

2. The method according to claim 1, wherein access barring parameters corresponding to the respective terminal moving speed levels or speed states are different from each other.

3. The method of claim 1, wherein sending the access barring rule to the terminal comprises:
adding, by the base station, the access barring rule to a system message; and
sending, by the base station, the system message to the terminal, to enable the terminal to acquire the access barring rule from the system message.

4. The method of claim 3, wherein the system message is a system information block type 2 (SIB2).

5. A method for controlling terminal access applied to a terminal comprising:
receiving an access barring rule from a base station when the terminal requests access to the base station, wherein the base station is capable of providing a high-speed-railway dedicated network service; and
initiating access to the base station in response to determining, according to the access barring rule, that a preset terminal access condition is satisfied,
wherein initiating access to the base station in response to determining, according to the access barring rule, that the preset terminal access condition is satisfied comprises:
determining an access barring parameter corresponding to a current moving speed according to preset correspondences between terminal moving speeds and access barring parameters, wherein the access barring rule comprises the preset correspondences between the terminal moving speeds and the access barring parameters; and
initiating access to the base station when the access barring parameter corresponding to the current moving speed satisfies the preset terminal access condition,
wherein the preset correspondences between the terminal moving speeds and the access barring parameters comprise: at least one terminal moving speed level or speed state, at least one terminal moving speed level or speed state corresponding to the terminal moving speed range and an access barring parameter, and terminal moving speed ranges corresponding to respective terminal moving speed levels or speed states being different from each other.

6. The method of claim 5, wherein determining the access barring parameter corresponding to the current moving speed according to the preset correspondences between the terminal moving speeds and the access barring parameters comprises:
determining a terminal moving speed level or speed state corresponding to the current moving speed, according to a terminal moving speed range corresponding to each of the at least one terminal moving speed level or speed state in the preset correspondences; and
determining the access barring parameter corresponding to the current moving speed, according to the access barring parameter corresponding to each of the at least one terminal moving speed level or speed state in the preset correspondences.

7. The method of claim 5, wherein initiating access to the base station when the access barring parameter corresponding to the current moving speed satisfies the preset terminal access condition comprises:
generating a random number based on uniform distribution, wherein the preset terminal access condition comprises a random number smaller than the access barring parameter corresponding to the current moving speed and generated based on uniform distribution; and
initiating access to the base station when the random number is smaller than the access barring parameter corresponding to the current moving speed.

8. A device for controlling terminal access applied to a base station, comprising:
one or more processors, and
a non-transitory computer-readable storage medium storing instructions executable by the one or more processors, wherein the one or more processors are configured to:
configure an access barring rule for controlling terminal access, wherein the base station is capable of providing a high-speed-railway dedicated network service for a terminal; and
send the access barring rule to the terminal to enable the terminal to determine an access barring parameter corresponding to a current moving speed, according to preset correspondences between terminal moving speeds and access barring parameters, and enable the terminal to initiate access to the base station when the access barring parameter corresponding to the current moving speed satisfies a preset terminal access condition,
wherein the preset correspondences between the terminal moving speeds and the access barring parameters comprise:
at least one terminal moving speed level or speed state, at least one terminal moving speed level or speed state corresponding to a terminal moving speed range and an access barring parameter, and terminal moving speed ranges corresponding to respective terminal moving speed levels or speed states being different from each other.

9. The device of claim 8, wherein access barring parameters corresponding to the respective terminal moving speed levels or speed states are different from each other.

10. The device of claim 8, wherein the one or more processors are further configured to:
add the access barring rule to a system message; and
send the system message to the terminal, to enable the terminal to acquire the access barring rule from the system message.

11. The device of claim 10, wherein the system message is a system information block type 2 (SIB2).

12. A device for controlling terminal access applied to a terminal, comprising:
one or more processors, and
a non-transitory computer-readable storage medium storing instructions executable by the one or more processors, wherein the one or more processors are configured to:
receive an access barring rule from a base station when the terminal needs to access the base station, wherein the base station is capable of providing a high-speed-railway dedicated network service; and
initiate access to the base station in response to determining, according to the access barring rule, that a preset terminal access condition is satisfied, wherein the one or more processors are further configured to:
  determine an access barring parameter corresponding to a current moving speed according to preset correspondences between terminal moving speeds and access barring parameters, wherein the access barring rule comprises the preset correspondences between the terminal moving speeds and the access barring parameters; and
    initiate access to the base station when the access barring parameter corresponding to the current moving speed satisfies the preset terminal access condition;
wherein the preset correspondences between the terminal moving speeds and the access barring parameters comprise: at least one terminal moving speed level or speed state, each terminal moving speed level or speed state corresponding to the terminal moving speed range and an access barring parameter, terminal moving speed ranges corresponding to respective terminal moving speed levels or speed states being different from each other.

13. The device of claim 12, wherein the one or more processors are further configured to:
  determine a terminal moving speed level or speed state corresponding to the current moving speed, according to a terminal moving speed range corresponding to each of the at least one terminal moving speed level or speed state in the preset correspondences; and
  determine the access barring parameter corresponding to the current moving speed, according to the access barring parameter corresponding to each of the at least one terminal moving speed level or speed state in the preset correspondences.

14. The device of claim 12, wherein the one or more processors are further configured to:
  generate a random number based on uniform distribution, wherein the preset terminal access condition comprises a random number smaller than the access barring parameter corresponding to the current moving speed and generated based on uniform distribution; and
  initiate access to the base station when the random number is smaller than the access barring parameter corresponding to the current moving speed.

\* \* \* \* \*